United States Patent [19]

Ohgoda et al.

[11] Patent Number: 4,996,542
[45] Date of Patent: Feb. 26, 1991

[54] APPARATUS FOR SCANNING SHEET-SHAPED RECORDING MEDIUM BETWEEN EDGE ROLLERS

[75] Inventors: Makoto Ohgoda; Kaoru Tamura, both of Kanagawa, Japan

[73] Assignee: Fuji Photo Film Co., Ltd., Kanagawa, Japan

[21] Appl. No.: 402,995

[22] Filed: Sep. 6, 1989

Related U.S. Application Data

[60] Continuation of Ser. No. 34,954, Apr. 6, 1987, abandoned, which is a division of Ser. No. 673,443, Nov. 20, 1984, Pat. No. 4,712,009.

[30] Foreign Application Priority Data

Nov. 21, 1983 [JP]  Japan ................................ 68-219312

[51] Int. Cl.$^5$ ........................................... G01D 15/16
[52] U.S. Cl. ...................................... 346/108; 400/636
[58] Field of Search ................. 346/108, 107 R, 76 R, 346/134, 136, 110 R; 250/327.2; 400/636, 617; 355/308, 309

[56] References Cited

U.S. PATENT DOCUMENTS

| | | | |
|---|---|---|---|
| 3,761,950 | 9/1973 | Yeiser | 346/134 |
| 4,492,455 | 1/1985 | Kawai | 346/134 |
| 4,676,582 | 2/1983 | Kato | 250/327.2 E |

Primary Examiner—Mark J. Reinhart
Attorney, Agent, or Firm—Sughrue, Mion, Zinn, Macpeak & Seas

[57] ABSTRACT

An apparatus for scanning a sheet-shaped recording medium comprises a conveyance system provided with a conveying roller and a plurality of nip rollers for conveying the recording medium in co-operation with the conveying roller, and a scanning optical system for scanning the conveyed recording medium by a light beam in a scanning direction normal to the conveyance direction. One of the conveying roller and the nip rollers is fabricated as edge rollers contacting the other of said conveying roller and said nip rollers only near both end portions of the other. The scanning optical system is positioned on the side of the edge rollers.

5 Claims, 1 Drawing Sheet

APPARATUS FOR SCANNING SHEET-SHAPED RECORDING MEDIUM BETWEEN EDGE ROLLERS

This is a continuation of application Ser. No. 07/034,954, filed Apr. 6, 1987, now abandoned, which is a division of application Ser. No. 06/673,443 filed Nov. 20, 1984, now U.S. Pat. No. 4,712,009.

BACKGROUND OF THE INVENTION

1. Field of the Invention

This invention relates to an apparatus for scanning a sheet-shaped recording medium by a light beam and recording an image thereon or reading out an image therefrom. This invention particularly relates to an apparatus for scanning a sheet-shaped recording medium, which is provided with an improved sub-scanning conveyance system wherein subscanning is conducted by moving the recording medium in one direction at a predetermined speed during two-dimensional scanning of the recording medium by a light beam.

2. Description of the Prior Art

An image scanning method for recording an image on a recording medium or for reading out an image therefrom by two-dimensionally scanning the recording medium by a light beam is widely used in facsimile devices and the like. In the method, two-dimensional scanning is conducted by deflecting a light beam by a light deflector in one direction (main scanning direction) to form a scanning line on the recording medium and by mechanically moving the recording medium in a direction (sub-scanning direction) normal to the main scanning direction, thereby forming many scanning lines in parallel with each other.

As disclosed, for example, in U.S. Patent No. 4,258,264 and Japanese Unexamined Patent Publication No. 56(1981)-11395, the aforesaid image scanning method is also employed for reading out a radiation image stored in a stimulable phosphor sheet or for reproducing the read-out radiation image in a recording medium in a radiation image recording and reproducing system. In the radiation image recording and reproducing system, it is necessary to regularly conduct scanning in the main scanning direction at a predetermined period and to carry out movement of the recording medium in the sub-scanning direction at a predetermined speed. That is, when the recording medium is moved at a low speed in the sub-scanning direction and, at the same time, a light beam is deflected in the main scanning direction normal to the sub-scanning direction on the recording medium, the recording medium must be precisely moved at the predetermined speed. Otherwise, recording nonuniformity or read-out nonuniformity arises, and it becomes impossible to obtain a reproduced image accurately representing the image density. Therefore, high accuracy is required for scanning in the sub-scanning direction, necessitating a high-precision expensive holding means and movement mechanism for the recording medium.

In order to move the recording medium as described above, various mechanisms have heretofore been used. For example, in one arrangement the sheet-shaped recording medium is closely contacted with the surface of a drum by using the clamping devices or pinch rolls, and the drum is rotated. Or, a suction box is positioned at a part inside of a drum, and the drum is rotated with the recording medium closely contacted with a part of the drum by suction. In another mechanism, a suction box is positioned inside of a perforated belt, and the belt is moved with the recording medium placed thereon. In these mechanisms, since the clamping devices or the suction box is required for closely contacting the recording medium with the drum or the belt, the mechanism becomes complicated and the apparatus becomes large and expensive.

Further, in the case where a suction box is used, there arise various problems in practical use such as noise and vibration from a blower for suction, fluctuation of the suction pressure, and the like. Particularly in a scanning apparatus for image recording or read-out wherein the recording medium must be moved precisely and a precise scanning optical system is incorporated, vibration and fluctuation of the suction pressure cause the movement speed of the recording medium to fluctuate and adversely affect the recording or read-out operation.

In an image read-out scanning apparatus for scanning a recording medium carrying an image stored therein by a light beam and for detecting light carrying the image obtained thereby, a light guide member is generally positioned near the recording medium. In this case, in order to improve the light guiding efficiency, it is generally desired that the light guide member be positioned as close to the recording medium as possible. However, when the conventional clamping devices or pinch rolls are used, it is not always possible to position the light guide member close to the recording medium because of the presence of mechanisms protruding in the vicinity of the clamping devices or the pinch rolls.

SUMMARY OF THE INVENTION

The primary object of the present invention is to provide an apparatus for scanning a sheet-shaped recording medium, which is comparatively small and has a simple configuration.

Another object of the present invention is to provide an apparatus for scanning a sheet-shaped recording medium, which securely holds a recording medium and realizes precise optical scanning.

The present invention provides an apparatus for scanning a sheet-shaped recording medium, the apparatus comprising: (i) a conveyance means comprising a conveying roller and a plurality of nip rollers for forming nips for conveying said sheet-shaped recording medium in co-operation with said conveying roller by contacting the surface of said conveying roller, and (ii) a scanning optical system for scanning said sheetshaped recording medium, which is conveyed by said conveyance means, by a light beam in a scanning direction approximately normal to the conveyance direction of said sheet-shaped recording medium, (iii) one of said conveying roller and said nip rollers being fabricated as edge rollers contacting the other of said conveying roller and said nip rollers only near both end portions of the other, (iv) said scanning optical system being positioned on the side of said edge rollers.

The sheet-shaped recording medium may be any photosensitive material on which an image can be optically recorded by scanning with a light beam or any image storage medium which carries an image stored therein and which releases light carrying the image when scanned by a light beam. The photosensitive material may, for example, be printing paper or a photographic film. The image storage medium may, for example, be paper or a film sheet carrying an image stored therein, or a stimulable phosphor sheet carrying a radiation image stored therein as disclosed, for example, in U.S Patent Nos. 4,236,078 and 4,239,968.

The image storage medium releasing the light carrying the stored image when scanned by a light beam may be of the type releasing light having the same wavelength as that of the light beam, i.e. of the type reflecting the light beam, or may be of the type emitting light having a wavelength different from that of the light beam.

By the term "edge rollers" are meant rollers contacting the other roller or rollers, that form nips in cooperation with the edge rollers, only near the end portions of the other roller or rollers in the width direction thereof. The conveying roller or the nip rollers are fabricated as a pair or edge rollers or two or more pairs of edge rollers. In this case, the widths of a plurality of nip rollers are made approximately equal to the width of the sheet-shaped recording medium, and the conveying roller is fabricated as a pair of narrow rollers contacting only near both end portions of each nip roller. Alternatively, the width of the conveying roller is made approximately equal to the width of the sheet-shaped recording medium, and at least one of a plurality of nip rollers is fabricated as a pair of narrow rollers contacting only near both end portions of the conveying roller.

In the present invention, the nip rollers contact the surface of the conveying roller so that the sheet-shaped recording medium can be grasped therebetween and conveyed. Thus the term "contacting" of the nip rollers with the surface of the conveying roller embraces the case where the surfaces of the nip rollers directly contact the surface of the conveying roller and the case where the surfaces of the nip rollers and the surface of the conveying roller are positioned in spaced relation to each other.

The diameter of the conveying roller may be larger or smaller than those of the nip rollers. However, in order to make the apparatus small and to convey the sheet-shaped recording medium more consistently, the diameter of the conveying roller should perferably be larger than those of the nip rollers.

In the apparatus for scanning a sheet-shaped recording medium in accordance with the present invention, when the sheet-shaped recording medium is scanned by a light beam for image read-out or recording, nips are formed between the conveying roller and a plurality of nip rollers, and the sheet-shaped recording medium is conveyed therebetween. That is, the sheet-shaped recording medium is conveyed in close contact with the conveying roller while the recording medium is maintained in a predetermined form bent by the roller. Therefore, it is possible to convey the sheet-shaped recording medium consistently and accurately in the sub-scanning direction. Also, even if the surface of the recording medium is uneven due to curling, distortion or the like when it is left in the free condition, it becomes even and straight in the width direction when it is conveyed in close contact with the surface of the conveying roller, and the even, straight sheet surface is scanned by the light beam in the main scanning direction. Accordingly, it becomes possible to accurately record or read out an image.

Further, in the apparatus for scanning a sheetshaped recording medium in accordance with the present invention, since clamping devices or a suction box is not used, the configuration of the apparatus becomes simple, and the apparatus becomes small, inexpensive and easy to maintain. Also, the problems of noise and vibration are eliminated.

When the scanning apparatus of the present invention is used for image read-out, since one of the conveying roller and the nip rollers is fabricated as the edge rollers and since there are no mechanisms such as clamp devices or pinch rolls protruding near the surface of a recording medium on which image read-out is conducted, it becomes possible to position a light source and a light guide member close to the recording medium as in the case where a suction box is used, and to improve the light guiding efficiency. That is, the scanning apparatus of the present invention has the advantage that it is free from noise and vibration as in the case where clamping devices or pinch rolls are used, and the advantage that the scanning read-out system can be positioned close to the recording medium as in the case where a suction box is used.

DESCRIPTION OF THE PREFERRED EMBODIMENTS

The present invention will hereinbelow be described in further detail with reference to the accompanying drawings.

Figure 1:
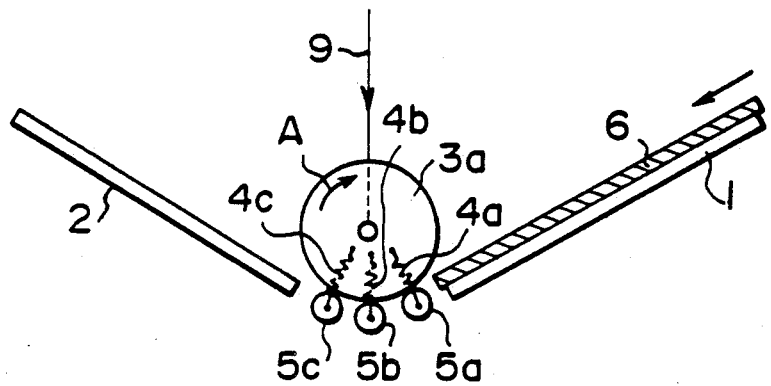
FIG. 1 is a side view showing an embodiment of the apparatus for scanning a sheet-shaped recording medium in accordance with the present invention when the apparatus is used for image read-out and a recording medium is introduced into the image read-out section.
Figure 2:
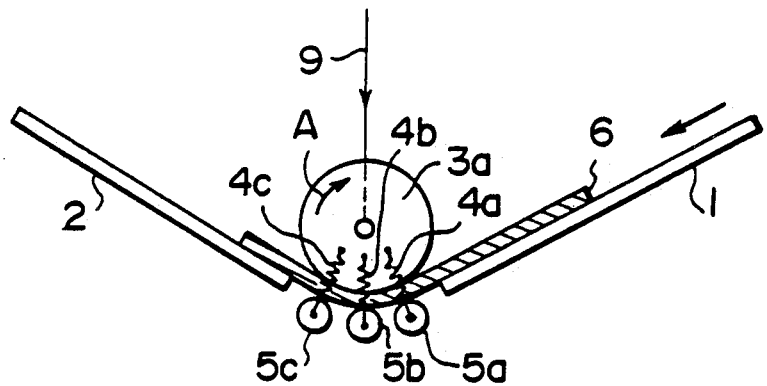
FIG. 2 is a side view showing the embodiment of FIG. 1 when an image stored in the recording medium is read out.
Figure 3:
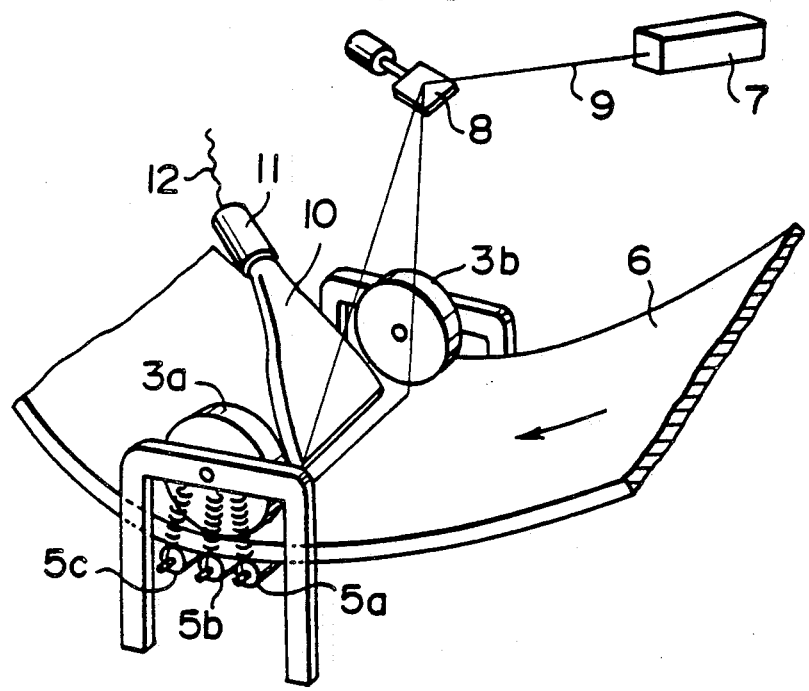
FIG. 3 is a perspective view showing the embodiment in the condition of FIG. 2.

FIGS. 1, 2 and 3 schematically show an embodiment of the apparatus for scanning a sheet-shaped recording medium in accordance with the present invention, which is used for reading out a radiation image. FIG. 1 shows the step of introducing a stimulable phosphor sheet 6 carrying a radiation image stored therein into an image read-out section. FIG. 2 shows the step of reading out the radiation image stored in the stimulable phosphor sheet 6, and FIG. 3 is a perspective view of the embodiment in the condition of FIG. 2.

Conveying rollers 3a and 3b and small nip rollers 5a, 5b, and 5c are positioned between an inlet guide plate 1 and an outlet guide plate 2. The conveying rollers 3a and 3b are fabricated as a pair of edge rollers rotated by a precision motor (not shown) at a predetermined speed in the direction as indicated by the arrow A. The nip rollers 5a, 5b, and 5c are urged by resilient members 4a, 4b, and 4c onto the surfaces of the conveying rollers 3a and 3b.

The widths of the inlet guide plate 1 and the outlet guide plate 2 are larger than the width of the stimulable phosphor sheet 6. The inlet guide plate 1 and the outlet guide plate 2 are positioned approximately symmetrically with respect to the conveying rollers 3a and 3b.

The stimulable phosphor sheet 6 carrying a radiation image stored therein is conveyed onto the inlet guide plate 1 as shown in FIG. 1. The stimulable phosphor sheet 6 is then nipped between the conveying rollers 3a and 3b and rollers 5a , 5b ,, and 5c as the conveying rollers 3a and 3b are rotated, and is conveyed toward the outlet guide plate 2 as shown in FIG. 2. At this time, the stimulable phosphor sheet 6 is nipped in close contact with the surfaces of the conveying rollers 3a and 3b by the nip rollers 5a, 5b, and 5c urged by the resilient members 4a, 4b, and 4c onto the surfaces of the conveying rollers 3a and 3b.

Thereafter, the stimulable phosphor sheet 6 is conveyed onto the outlet guide plate 2.

As shown in FIG. 3, a light source 7 for emitting a light beam 9 and a galvanometer mirror 8 for making the light beam 9 impinge upon the stimulable phosphor sheet 6 so as to scan it forward and backward in the width direction thereof, i.e. in the main scanning direction are positioned above the conveying rollers 3a and 3b. Further, between the conveying rollers 3a and 3b is positioned a light guide member 10 for guiding light emitted by the stimulable phosphor sheet 6 when the stimulable phosphor sheet 6 is exposed to the light beam 9 is positioned so that a front end face of the light guide member 10 extends in the width direction of the bent portion of the stimulable phosphor sheet 6. A rear end face of the light guide member 10 is closely contacted with a photomultiplier 11 for converting the light emitted by the stimulable phosphor sheet 6 into an electric signal. The photomultiplier 11 is connected to a cable 12 for sending the electric signal to an image reproducing apparatus (not shown) for reproducing a visible image in a photosensitive material or for displaying it on a cathode ray tube or the like.

When the stimulable phosphor sheet 6 is exposed to the light beam 9 and the light emitted thereby is detected, the stimulable phosphor sheet 6 nipped between the conveying rollers 3a and 3b and the nip rollers 5a, 5b, and 5c is bent and securely supported to fit the circumferential surfaces of the conveying rollers 3a and 3b. Therefore, the bent portion of the stimulable phosphor sheet 6 is freed from curling, distortion, or the like by the bending action, and becomes even and straight in the width direction of the stimulable phosphor sheet 6. The bent portion thus made even and straight is scanned by the light beam 9 emitted by the light source 7 via the galvanometer mirror 8 in the main scanning direction, and is caused thereby to emit light in proportion to the radiation energy stored. During this step, the stimulable phosphor sheet 6 is conveyed by the conveying rollers 3a and 3b and the nip rollers 5a, 5b, and 5c at a predetermined speed toward the outlet guide plate 2, i.e. in the sub-scanning direction. Therefore, the whole surface of the stimulable phosphor sheet 6 is scanned by the light beam 9 in the main scanning direction and in the sub-scanning direction.

It should be understood that the present invention can be embodied in various types other than the above described embodiment. For example, the scanning apparatus in accordance with the present invention can, of course, be applied also to an image recording apparatus. Further, instead of fabricating the conveying roller as the edge rollers, it is also possible to fabricate at least one of the nip rollers as the edge rollers.

We claim:

1. An apparatus for scanning a sheet-shaped recording medium (6), the apparatus comprising:
   (i) a conveyance means comprising a conveying roller and a plurality of nip rollers (5a, 5b, 5c) for forming nips for conveying the sheet-shaped recording medium in a conveyance direction in cooperation with said conveying roller by contacting the surface of said conveying roller, and
   (ii) a scanning optical system for scanning the sheet-shaped recording medium, which is conveyed by said conveyance means, by a light beam in a scanning direction approximately normal to the conveyance direction of the sheet-shaped recording medium,
   (iii) said conveying roller being fabricated as a pair of edge rollers (3a, 3b), said edge rollers having opposing faces int eh scanning direction, and said edge rollers contacting said nip rollers only near both end portions of said nip rollers such that the sheet-shaped recording medium is bent to fit a circumferential surface of each of said edge rollers to thereby form a bent portion,
   (iv) said scanning optical system being positioned on the same side of the sheet-shaped recording medium as said edge rollers for scanning the sheet-shaped medium along said bent portion between the opposing faces of said pair of edge rollers.

2. An apparatus as defined in claim 1 wherein said conveying roller has a diameter larger than those of said nip rollers.

3. An apparatus as defined in claim 1 wherein said conveyance means further comprises an inlet guide plate and an outlet guide plate which have a width larger than that of said sheet-shaped recording medium and which are positioned approximately symmetrically with respect to said conveying roller.

4. An apparatus as defined in claim 1 wherein said conveying roller and said nip rollers are urged toward each other by resilient members.

5. An apparatus for scanning a sheet-shaped recording medium, the apparatus comprising;
   (i) a conveyance means comprising a conveying roller and a plurality of nip rollers for forming nips for conveying the sheet-shaped recording medium in a conveyance direction in cooperation with said conveying roller by contacting the surface of said conveying roller, and
   (ii) a scanning optical system for scanning the sheet-shaped recording medium, which is conveyed by said conveyance means, by a light beam in a scanning direction approximately normal to the conveyance direction of the sheet-shaped recording medium,
   (iii) one of said nip rollers being fabricated as a pair of edge rollers, said edge rollers having opposing faces in the scanning direction, and said edge rollers contacting said conveying roller only near both end portions of said conveying roller such that the sheet-shaped recording medium is bent to fit a circumferential surface of each of said edge rollers to thereby form a bent portion,
   (iv) said scanning optical system being positioned on the same side of the sheet-shaped recording medium as said edge rollers for scanning the sheet-shaped medium along said bent portion between the opposing faces of said pair of edge rollers.

* * * * *

UNITED STATES PATENT AND TRADEMARK OFFICE
CERTIFICATE OF CORRECTION

PATENT NO. : 4,996,542

DATED : February 26, 1991

INVENTOR(S) : Makoto Ohgoda et al.

It is certified that error appears in the above-identified patent and that said Letters Patent is hereby corrected as shown below:

On the title page at item [30], entitled Foreign Application Priority Data change "Nov. 21, 1983 [JP] Japan ..... 68-219312" to --Nov. 21, 1983 [JP] Japan .... 58-219312--.

Signed and Sealed this

Twenty-fifth Day of August, 1992

Attest:

DOUGLAS B. COMER

Attesting Officer

Acting Commissioner of Patents and Trademarks